United States Patent [19]

Bauer

[11] 4,413,896

[45] Nov. 8, 1983

[54] PLANE FILM CASSETTE

[75] Inventor: Walter Bauer, Munich, Fed. Rep. of Germany

[73] Assignee: AFGA-Gevaert AG, Leverkusen, Fed. Rep. of Germany

[21] Appl. No.: 376,824

[22] Filed: May 10, 1982

[30] Foreign Application Priority Data

May 20, 1981 [DE] Fed. Rep. of Germany ....... 3119987

[51] Int. Cl.³ .............................................. G03B 17/26
[52] U.S. Cl. .................................................... 354/277
[58] Field of Search ............................... 354/275–277, 354/283–285; 378/182

[56] References Cited

U.S. PATENT DOCUMENTS 335,056 12/1886 Bowdish ............................. 354/277
3,537,376 11/1970 Fleming ............................. 354/277

FOREIGN PATENT DOCUMENTS 1189846 3/1965 Fed. Rep. of Germany ...... 378/182

Primary Examiner—John Gonzales
Attorney, Agent, or Firm—Michael J. Striker

[57] ABSTRACT

A plane film cassette has a housing with an illumination opening and a slot, a light-protective cover insertable into the slot to protect a film, and light-tight elements located at opposite sides of the slot and magnetically attractable towards one another so that one of the light-tight elements can move towards the other light-tight element, whereby with the inserted light-protective cover this light-tight element abuts against the latter and with the withdrawn light-protective cover the light-tight elements abut against one another in light-tight manner.

20 Claims, 2 Drawing Figures

PLANE FILM CASSETTE

BACKGROUND OF THE INVENTION

The present invention relates to a plane film cassette for receiving at least one film. More particularly, it relates to a plane film cassette which has an illumination window at one of its sides, and a light-protective plate insertable into a slot of the cassette so as to cover the film in the cassette in light-tight manner.

Plane film cassettes of the above mentioned general type, which are designed for receiving two films and have two illuminating windows with light-protective plates, are disclosed for example in U.S. Pat. No. 3,373,673. In this cassette the required light-tightness in the slot for insertion of the light-protective plate from the interior of the cassette is performed by a plurality of elastic fingers which press from the interior of the cassette outwardly onto the light-protective plate when the latter is in the slot, or onto the cassette outer part when the light-protective plate is withdrawn from the slot. These fingers are coated with throughgoing strips of velvet for light-tightness. The disadvantage of such cassette is that, particularly for cassettes of large format or cassettes of relatively soft material such as synthetic plastic, the center of the cassette in the slot region is pressed through or bulged. Thereby the abutment of the strips over the entire width of the slot is no longer guaranteed, and light can penetrate into the interior of the cassette and expose the film.

SUMMARY OF THE INVENTION

Accordingly, it is an object of the present invention to provide a plane film cassette which avoids the disadvantages of the prior art.

More particularly, it is an object of the present invention to provide a plane film cassette having simple means which guarantees a reliable light-tightness of the slot in the cassette.

In keeping with these objects, and with others which will become apparent hereinafter, one feature of the present invention resides, briefly stated, in a plane film cassette for receiving at least one film in which light-tight means are formed as two light-tight elements located at opposite sides of the slot, magnetically attractable towards one another, and arranged so that one of the light-tight elements is movable relative to the other of the light-tight elements toward the plane of a light-protective cover.

When the plane film cassette is designed in accordance with the present invention, it eliminates the disadvantages of the prior art.

In cassettes of large formats or in cassettes composed of synthetic plastic material, a reliable light-tightness is provided, inasmuch as the movable magnetic element firmly abuts against the light-protective plate under the action of magnetic attraction when the light-protective plate is in the slot, and firmly abuts against the other light-tight element when the plate is withdrawn from the slot. The magnetic forces apply no pressure against the walls of the cassette, so that bulging of cassettes of very large formats is eliminated.

In accordance with another feature of the present invention, one light-tight element is arranged on an elastic member. The other light-tight element may also be arranged on an elastic member. As a result of this, the light-tight elements mounted on the elastic members exactly follow deformations of the cassette which can take place.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
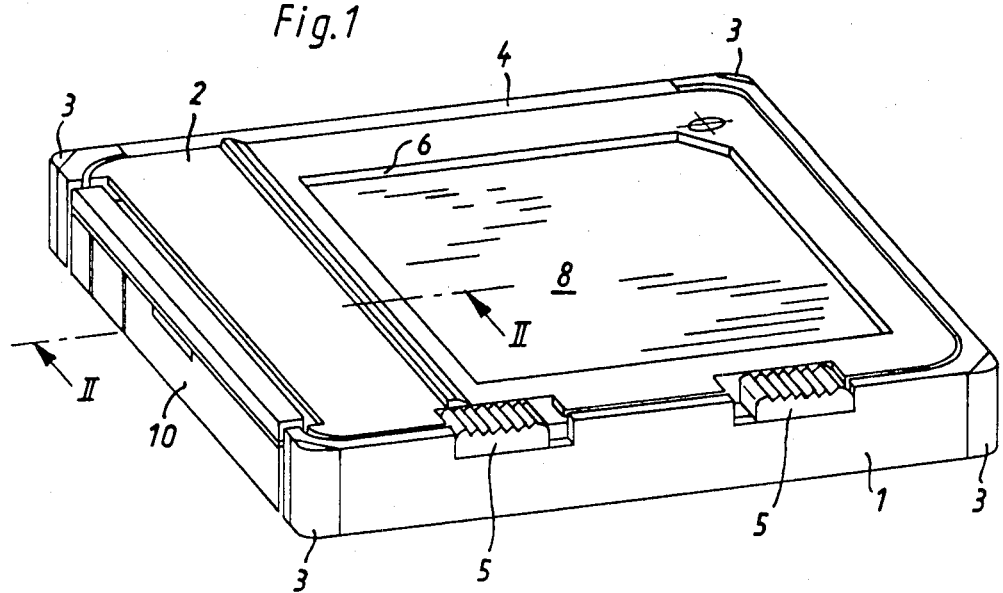
FIG. 1 is a perspective view of a plane film cassette in accordance with the present invention.

A plane film cassette in accordance with the present invention has a lower part or a cassette bottom identified by reference numeral 1 and an upper part or a cassette cover identified by reference numeral 2.

The lower part has a stable frame with three sides. Elastic shaped members 3 are arranged at its four corners for protection against impacts. The upper part 2 is pivotally connected at its one side with the lower part 2 by a hinge 4. Locking elements 5 are provided in the lower part opposite to the hinge 4 and cooperate with a not shown pin formed on the cover.

An opening 6 forming an illumination window is provided in the upper part 2. A slot 7 for insertion of a light-protective plate 8 is also formed in the upper part 2. The inner face of the upper part 2 which faces toward the lower part 1 carries an elastic frame 9 which extends around the periphery and limits the illumination window. The frame 9 is composed advantageously of foam material and presses in closed condition of the cassette against a flat portion 1a of the lower part 1. Only a small section of the frame 9 can be seen in FIG. 2.

The light-protective plate 8 has a gripping projection 10 which is easy to engage because of a recess in the lower part 1 and the upper part 2. As can be seen from FIG. 2, a pushbutton 11 is arranged at the inner side of the gripping projection 10 and has only a small web 11a which is associated with the gripping projection. The pushbutton 11 can move in springy manner in direction of the arrow 12.

A hook 13 is formed on the pushbutton and cooperates with a projection 14 of the lower part 1. Thereby, when the light-protective plate 8 is inserted, the hook 13 engages with the projection 14 of the bottom part and can be disengaged therefrom only by pressing the pushbutton 11 from the arresting position. Because of this, an erroneous pulling of the gripping projection, and thereby exposure of the inserted film, is prevented.

Figure 2:
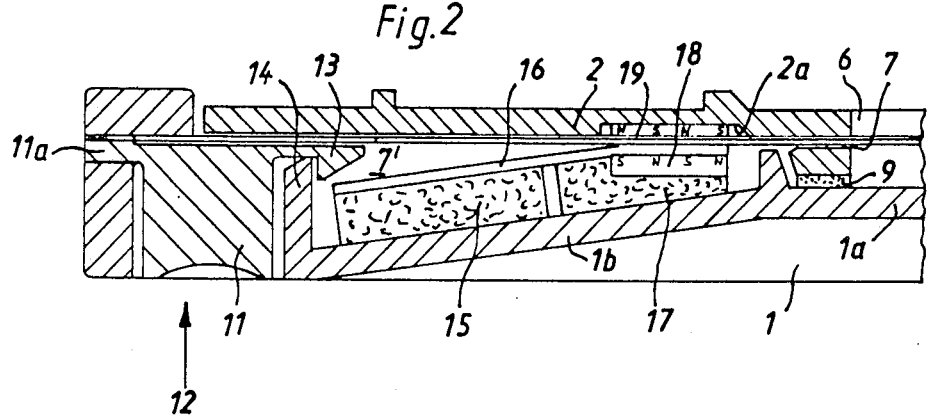
FIG. 2 is a view showing a section taken along the line 2—2 in FIG. 1.

FIG. 2 shows the light-tight means for sealing the slot of the light-protective plate. The lower part 1 has an inclined face 1b which descends in direction toward the outer side of the cassette from the upper part. A strip 15 is arranged on the inclined face 1b and extends in direction transverse to the direction of insertion of the light-protective plate 8 over the entire width of the slot. It extends to the lateral limiting regions of the inclined face 1b. The strip 15 is composed advantageously of a foam material.

A further strip 17 is located near the fixed strip 15 and can also be composed of an elastic material and extend over the entire width of the slot. The strip 17 is not connected with the inclined face 1b of the lower part 1. Both strips 15 and 17 are connected at their upper faces with an elastic layer formed advantageously as a textile strip 16 extending over the entire width of the slot. The textile strip 16 can be connected with the strips 16 and 17 for example by glue. The textile strip 16 can be composed of felt, velvet, plush, and the like.

A magnetic strip 18 is arranged on the strip 17 and more particularly on the portion thereof closest to the upper part 2. The magnetic strip 18 is inserted between the textile strip 16 and the strip 17 so as to be firmly held between these two parts, and also extends over the entire width of the slots. A depression 2a is formed in the upper part 2 opposite to the magnetic strip 8, and a counterstrip 19 is received in the depression 2a. The counterstrip 19 extends over the entire width of the slot and is formed either of a ferromagnetic material or as a magnetic plate. In the latter case, the opposite poles of the magnetic strip 18 and the magnetic strip 19 are located opposite to one another. A fine textile strip can form a coating of the counterstrip 19.

The thus described light-tight means is located in a region 7' of the slot 7 which forms an inlet between the lower part 1 and the upper part 2 for insertion of the light-protective plate. With the presence of sufficient sealing between the upper part and the lower part, the light-tight means in accordance with the present invention can be formed only in the slot 7 of the upper part 2. This can particularly be provided in massive cassettes without cover in which film loading and unloading is performed through a small flap at the other location of the cassette.

In operation, the light-protective plate 8 is first inserted into the cassette, as can be seen in FIG. 2. The magnetic strip 18 and the counterstrip 19 are attracted towards one another so that the textile strip 16 abuts against the inner side of the light-protective plate 8, and thereby the intermediate space is closed from the film chamber. When after pressing the bottom 11 the light-protective plate 8 is withdrawn from the cassette, the attraction force acts further and the magnetic strip 18 and the counterstrip 19 are attracted towards one another so that the textile strip 16 abuts against the counterstrip 19 or its coating in light-tight manner. This sealing is necessary inasmuch as the cassette is located in a shooting device in which the illumination window 6 is protected from undesirable light impingement. However, the withdrawal side for the light-protective plate is not protected. After the exposure, the light-protective plate 8 is again inserted through the inlet 7' and the slot 7 into the cassette. Since the textile strip 16 is inclined because of the inclined face 1b, it is slowly pressed back together with the magnetic strip 18 from the counterstrip 19 until the position shown in FIG. 2 is obtained. With fully inserted light-protective plate 8, the cassette can be withdrawn from the shooting device.

As mentioned above, the counterstrip 19 can be fixedly arranged in the depression 2a of the upper part 2. Since it is held in the depression by a further textile strip which must be connected to the upper part 2, the counterstrip itself must not be connected with the upper part 2. As a result of this, an insignificant movement of the counterstrip 19 normal to the plane of the light-protective plate 8 is also possible. Thus, the light-tight closure is further improved.

The magnetic strip 18 and the counterstrip 19 can be formed flexible. It is not necessary to form them uninterrupted. Instead, they may be provided with a row of openings or composed of several individual strip-shaped elements spaced from one another.

The cassette may be provided with two slots for insertion of two light-protective covers for two films. In this case, the above described light-tight means is associated with each of the slots so as to light-tightly abut against each light-protective cover in its inserted position, and to provide light-tight abutment of its light-tight strips when the light-protective cover is withdrawn.

It will be understood that each of the elements described above, or two or more together, may also find a useful application in other types of constructions differing from the types described above.

While the invention has been illustrated and described as embodied in a plane film cassette, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A plane film cassette for receiving at least one film, comprising a housing having two substantially flat walls, a slot provided between said walls and an illumination window provided in one of said walls; a light-protective plate insertable in a predetermined plane into said housing through said slot so as to close said window and to thereby light-tightly cover a film in the cassette; and light-tight means provided in said slot and including two light-tight elements at opposite sides of said slot, said light-tight elements being magnetically attractable toward one another and one of said light-tight elements being movable relative to the other of said light-tight elements toward said plane so that when said light-protective plate is in said slot said one light-tight elements abuts against said light-protective plate in a light-tight manner, whereas when said light-protective plate is not in said slot said light-tight elements abut against one another in a light-tight manner.

2. A plane film cassette as defined in claim 1, wherein said slot has a predetermined width, said light-tight elements of said light-tight means extending substantially over the entire width of said slot.

3. A plane film cassette as defined in claim 1, wherein said other light-tight element of said light-tight means is arranged immovable.

4. A plane film cassette as defined in claim 1, wherein said other light-tight element of said light-tight means is arranged somewhat movable toward said plane of said light-protective plate.

5. A plane film cassette as defined in claim 1, wherein said one light-tight element of said light-tight means is formed as a magnetic strip, whereas said other light-tight element is formed as a ferromagnetic counterstrip.

6. A plane film cassette as defined in claim 1, wherein said light-tight means further includes an elastic member which coats said one light-tight element at its side facing toward said light-protective plate and is connected with one of said walls.

7. A plane film cassette as defined in claim 6, wherein said elastic member is composed of a textile material selected from the group consisting of felt, plush and velvet.

8. A plane film cassette as defined in claim 6, wherein said slot has a predetermined width, said elastic member extending over the entire width of said slot.

9. A plane film cassette as defined in claim 6, wherein said light-tight means also includes at least one further elastic member fixedly connected directly with said one wall of said housing, said first-mentioned elastic member being mounted on said further elastic member.

10. A plane film cassette as defined in claim 9, wherein said light-tight means includes two such further elastic members fixedly connected with said one wall of said housing and mounting said first-mentioned elastic member thereon.

11. A plane film cassette as defined in claim 1, wherein said walls of said housing form an upper part and a lower part defining said slot therebetween, said slot having an inlet region arranged for starting the insertion of said light-protective plate, said lower part having a surface which in said inlet region of said slot is inclined outwardly from said upper part.

12. A plane film cassette as defined in claim 5, wherein one light-tight member of said light-tight means is arranged on one of said walls, the other of said walls having a depression in which said other light-tight member is received.

13. A plane film cassette as defined in claim 12, wherein said other light-tight member rests in said depression without being fixed therein, said light-tight means further including an additional elastic member mounted on said other wall and retaining said other light-tight member in said depression.

14. A plane film cassette as defined in claim 13, wherein said additional elastic member is formed as a textile strip.

15. A plane film cassette as defined in claim 1, wherein said housing further has a further such slot; and further comprising a further such light-protective plate insertable into said further slot so that two films can be received in the cassette, and further such light-tight means in said further slot provided with further such two light-tight elements.

16. A plane film cassette as defined in claim 1, wherein said one light-tight element is formed as a movable strip of a ferromagnetic material, whereas said other light-tight element is formed as a magnetic counterstrip.

17. A plane film cassette as defined in claim 1, wherein at least one of said light-tight elements of said light-tight means is interrupted.

18. A plane film cassette as defined in claim 17, wherein both said light-tight elements of said light-tight means are interrupted.

19. A plane film cassette as defined in claim 17, wherein said at least one light-tight element has a row of openings.

20. A plane film cassette as defined in claim 17, wherein said at least one light-tight element is composed of a plurality of individual strip-shaped parts spaced from one another.

* * * * *